United States Patent
Choe

(10) Patent No.: US 7,840,978 B2
(45) Date of Patent: Nov. 23, 2010

(54) DEVICE AND METHOD FOR UPDATING FUNCTION IN DIGITAL BROADCASTING SIGNAL RECEIVER

(75) Inventor: Hyun-chul Choe, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 904 days.

(21) Appl. No.: 11/213,717

(22) Filed: Aug. 30, 2005

(65) Prior Publication Data

US 2006/0048183 A1 Mar. 2, 2006

(30) Foreign Application Priority Data

Aug. 31, 2004 (KR) .................. 10-2004-0068918

(51) Int. Cl.
*H04N 5/445* (2006.01)
(52) U.S. Cl. .................. 725/39; 725/44; 725/50
(58) Field of Classification Search .......... 725/132; 348/553, 558
See application file for complete search history.

(56) References Cited

U.S. PATENT DOCUMENTS

| | | | | | |
|---|---|---|---|---|---|
| 4,962,427 | A | * | 10/1990 | Lunn et al. | 348/555 |
| 5,570,134 | A | * | 10/1996 | Hong | 348/467 |
| 5,625,406 | A | * | 4/1997 | Newberry et al. | 725/54 |
| 6,182,287 | B1 | * | 1/2001 | Schneidewend et al. | 725/48 |
| 6,233,734 | B1 | * | 5/2001 | Macrae et al. | 725/50 |
| 6,313,886 | B1 | * | 11/2001 | Sugiyama | 348/731 |
| 6,340,997 | B1 | * | 1/2002 | Borseth | 348/731 |
| 7,024,676 | B1 | * | 4/2006 | Klopfenstein | 725/49 |
| 7,075,899 | B2 | * | 7/2006 | Sheehan et al. | 370/257 |
| 7,086,076 | B1 | * | 8/2006 | Park | 725/50 |
| 7,430,017 | B2 | * | 9/2008 | Lee | 348/558 |
| 2001/0006404 | A1 | * | 7/2001 | Yun | 348/553 |
| 2003/0101448 | A1 | * | 5/2003 | Kim | 725/9 |
| 2003/0217369 | A1 | * | 11/2003 | Heredia | 725/152 |
| 2003/0219081 | A1 | | 11/2003 | Sheehan et al. | |
| 2004/0123317 | A1 | * | 6/2004 | Ozawa | 725/39 |
| 2004/0163110 | A1 | * | 8/2004 | Won | 725/40 |
| 2006/0025093 | A1 | * | 2/2006 | Shield et al. | 455/179.1 |
| 2006/0026643 | A1 | * | 2/2006 | Silverberg et al. | 725/46 |
| 2006/0026662 | A1 | * | 2/2006 | Shield et al. | 725/134 |
| 2006/0150217 | A1 | * | 7/2006 | Joo et al. | 725/50 |
| 2007/0022461 | A1 | * | 1/2007 | Lee | 725/135 |

FOREIGN PATENT DOCUMENTS

| | | |
|---|---|---|
| EP | 1126707 A1 | 8/2001 |
| JP | 6-292097 A | 10/1994 |
| KR | 1995-0026220 A | 9/1995 |

(Continued)

*Primary Examiner*—Andrew Y Koenig
*Assistant Examiner*—Junior O Mendoza
(74) *Attorney, Agent, or Firm*—Sughrue Mion, PLLC

(57) ABSTRACT

A device and a method of updating a function in a digital broadcasting signal receiver. The device includes a storage section storing data for executing various functions provided to a digital broadcasting receiving section; a program specific information/service information (PSI/SI) extraction section extracting PSI/SI from a received digital broadcasting signal; and a function realization section identifying a supported function from the digital broadcasting signal according to the PSI/SI and searching the data for executing the identified function from the storage section so that the identified function can be executed in the digital broadcasting receiving section.

24 Claims, 4 Drawing Sheets

FOREIGN PATENT DOCUMENTS

| | | |
|---|---|---|
| KR | 1999-0030592 A | 5/1999 |
| KR | 1999-0039767 A | 6/1999 |
| KR | 1998-067587 A | 9/1999 |
| KR | 2003-0067816 A | 8/2003 |
| WO | 02/21841 A1 | 3/2002 |
| WO | 02/30130 A1 | 4/2002 |
| WO | 2004/066630 A2 | 8/2004 |

* cited by examiner

DEVICE AND METHOD FOR UPDATING FUNCTION IN DIGITAL BROADCASTING SIGNAL RECEIVER

CROSS-REFERENCE TO RELATED APPLICATIONS

This application claims priority from Korean Patent Application No. 2004-68918, filed on Aug. 31, 2004, the entire content of which is incorporated herein by reference.

BACKGROUND OF THE INVENTION

1. Field of the Invention

Apparatuses and methods consistent with the present invention relate to updating a function in a digital broadcasting signal receiver, and more particularly, to updating a function in a digital broadcasting signal receiver capable of analyzing digital broadcast information from a transmitted digital broadcasting signal, thereby updating a function provided to the digital broadcasting signal receiver.

2. Description of the Related Art

Typical standards for digital television (DTV) broadcasting include Digital Video Broadcasting (DVB) which is a European broadcasting standard and Advanced Television Systems Committee (ATSC) which is an American broadcasting standard.

The DTV standards are divided into an European standard and an American standard, etc., so that they are not globally unified. In addition, even the countries which adopted the same DTV standards did not adopt the whole contents of the standard, but selectively combined standards to adopt the parts thereof suitable for their digital environments.

Accordingly, the DTV standards are different from country to country, so that manufacturers, who produce and sell TVs for the whole world, should load different programs to execute a function supported in a certain standard according to the standards different from country to country or adjust the programs to meet the DTV standard of every country, even though they have produced the same hardware. As a result, the manufacturing processes have become complicated.

In particular, menu programs for selecting the programs loaded to execute the functions supported in the DTV broadcasting and inputting an executable instruction become different. Accordingly, the menu programs loaded in the manufacturing process become different from each other, so that when using a product, which is delivered in one country, it is impossible to use a function supported in the DTV broadcasting in a different country.

Accordingly, the products delivered to different countries may be different from each other, so that the manufacturers, who produce a product for the whole world, should separately produce the products as many as they are needed, considering the distribution or sales in each of the countries.

Further, even when the DTV broadcasting can additionally support a new function as the broadcasting environments are changed in a country, it is not possible to use the added function because a menu for selecting the added function is not provided to the menu program loaded in the existing delivered product and a program for executing the added function is not also loaded.

In addition, even when the existing supported function is not supported any more due to the change of the broadcasting environments, a menu for selecting the unsupported function is displayed in a digital broadcasting signal receiver, thereby causing a user to be confused.

SUMMARY OF THE INVENTION

The present invention provides a device and a method for updating a function in a digital broadcasting signal receiver capable of updating a function provided to the receiver according to DTV broadcasting environments.

According to an aspect of the present invention, there is provided a device for updating a function in a digital broadcasting signal receiver, the device comprising a storage section storing data for executing various functions provided by a digital broadcasting receiving section; a program specific information/service information (PSI/SI) extraction section extracting PSI/SI from a received digital broadcasting signal; and a function realization section identifying a supported function from the digital broadcasting signal according to the PSI/SI and searching the data for executing the identified function from the storage section so that the identified function can be executed in the digital broadcasting receiving section.

The function realization section may comprise an information analysis unit parsing the PSI/SI to analyze table information, a function identification unit identifying the function provided to the digital broadcasting signal according to the table information, and a function structuring unit searching the data for executing the identified function from the storage section.

The device may further comprise a menu creation section creating a menu having a selection item for the identified function.

The function realization section may map the searched data for executing the function to the selection item of the menu.

The function identification unit may create and store an updating function list consisting of the identified functions in the storage section and the menu creation section may create the menu according to the updating function list.

The function realization section may make a distinction between the data for executing the identified function and other data stored in the storage section.

In accordance with another aspect of the present invention, there is provided a method for updating a function in a digital broadcasting signal receiver, the method comprising: analyzing PSI/SI from a received digital broadcasting signal to identify a function supported in the digital broadcasting signal; searching data for executing the identified function from data previously stored to execute various functions provided to the digital broadcasting signal receiver; and updating a menu to include a selection item for selecting the function provided to the digital broadcasting signal receiver so that the identified function can be executed according to the searched data.

The identifying the function may parse the PSI/SI to analyze table information and compare it with the data for executing the function to identify the function.

The updating the menu may map the searched data for executing the function to the selection item of the menu.

The identifying the function may create an updating function list consisting of the identified functions and the updating the menu may update the menu according to the updating function list. But doing so, it is not necessary to separately load the different programs according to the various functions supported by the diverse standards in the countries. In addition, it is possible to automatically update a function provided to the digital broadcasting signal receiver according to the changes of the DTV broadcasting environments.

BRIEF DESCRIPTION OF THE DRAWINGS

The above and other aspects of the present invention will be more apparent by describing exemplary embodiments of the present invention with reference to the accompanying drawings, in which.

DETAILED DESCRIPTION OF THE EXEMPLARY EMBODIMENTS

Hereinafter, exemplary embodiments of the present invention will be described with reference to the accompanying drawings. In the following description of the exemplary embodiments of the present invention, a detailed description of known functions and configurations incorporated herein will be omitted when it may make the subject matter of the present invention rather unclear.

Figure 1:
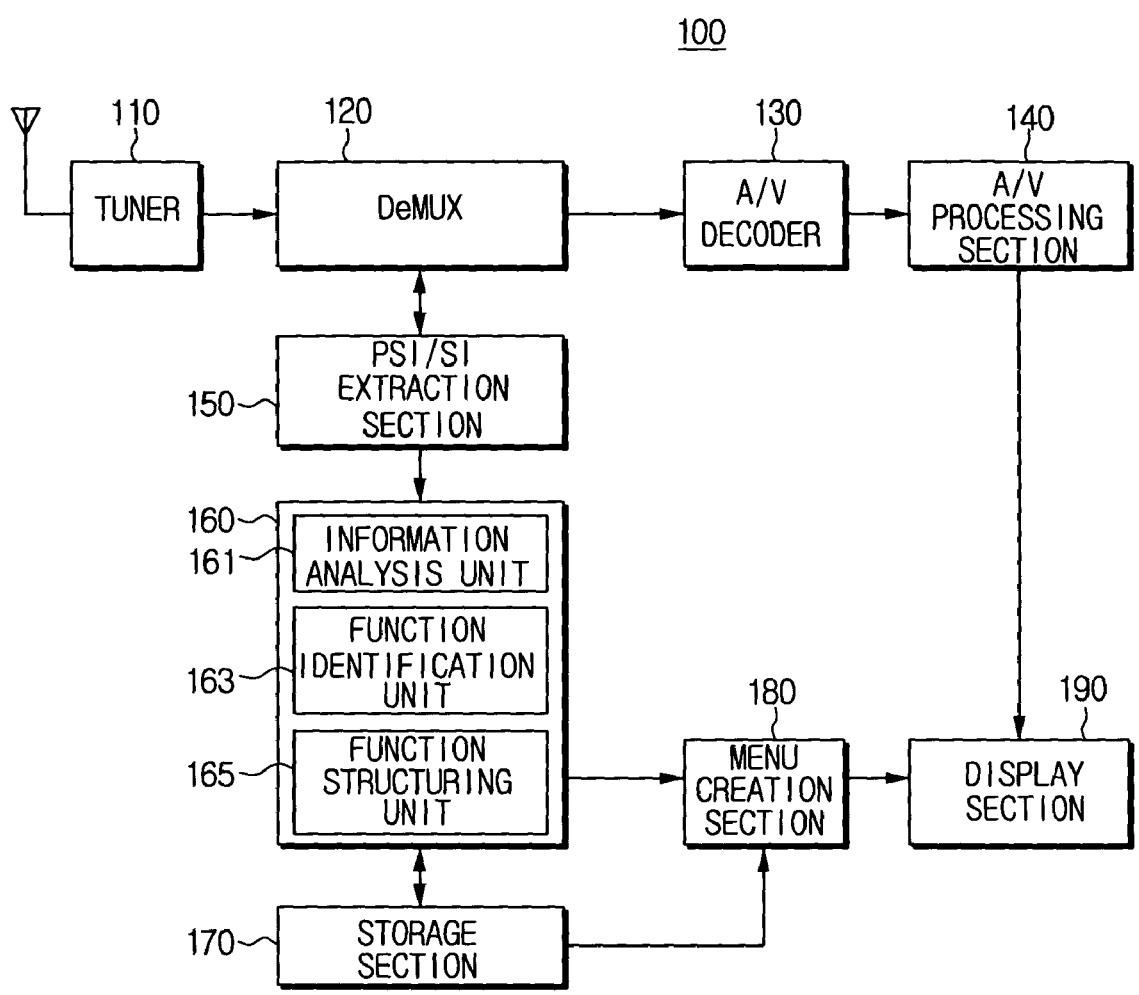
FIG. 1 is a block diagram showing a digital broadcasting signal receiver applied with a function list updating device according to an exemplary embodiment of the present invention.

FIG. 1 schematically shows an exemplary digital broadcasting signal receiver to which the present invention is applied.

Referring to FIG. 1, a digital broadcasting signal receiver 100 comprises a tuner 110, a demultiplexer (DeMUX) 120, an audio/video (A/V) decoder 130, an A/V processing section 140, a PSI/SI extraction section 150, a function realization section 160, a storage section 170, a menu creation section 180, a control section 185 and a display section 190.

The digital broadcasting signal receiver 100 in FIG. 1 schematically shows blocks related to operations of the function updating device according to an exemplary embodiment of the present invention and other blocks are omitted.

The tuner 110 selects a channel of a plurality of channels received through an antenna, for example, channels provided to a ground wave broadcasting and a satellite broadcasting, etc. A signal received through the selected channel has a transport stream form. The transport stream comprises program specific information/service information (PSI/SI) and additional data as well as a digital broadcasting signal.

The PSI comprises information about an individual program included in the transport stream (TS). In other words, the PSI is data repeatedly transmitted at an interval in the transport stream, consists of a table structure divided into sections and comprises program association table (PAT) information, program map table (PMT) information, conditional access table (CAT) information and transport stream description table (TSDT) information, etc. The PAT information provides information regarding a PMT packet identifier (PID) of each program with a table having a zero of PID among the PSI, the PMT information provides information regarding contents of the streams and the PID included in a program. In addition, the CAT information provides information for a limited reception and the TSDT information provides information about the whole transport streams, for example, to specify a type of a receiver such as DVB or ATSC.

The SI comprises information about a multiplex included in the transport stream and consists of a table structure divided into sections like the PSI. The SI comprises network information table (NIT) information, bouquet allocation table (BAT) information, service description table (SDT) information and event information table (EIT) information, etc.

The PSI/SI comprise various kinds of information about a digital broadcasting signal included in the transport stream and each of the information exists in a pre-specified location such as a descriptor in the PSI/SI tables. Accordingly, if the table information, which is required to analyze a table ID of the PSI/SI extracted from the transport stream and thus to perform functions provided to a current broadcasting, is deciphered, it is possible to identify whether each of the functions is supported by the current DTV broadcasting.

The DeMUX 120 demultiplexes the transport stream of the channel selected by the tuner 110 according to characteristics thereof. In other words, the DeMUX 120 separates the digital broadcasting signal from the received transport stream and then provides the separated signal to the A/V decoder 130. In addition, it separates a signal added to the transport stream and then the separated signal to the PSI/SI extraction section 150.

The PSI/SI extraction section 150 extracts the PSI/SI from the signal input from the DeMUX 120 and provides the extracted information to the function realization section 160.

The function realization section 160 analyzes the information about the transmitted digital broadcasting signal to identify a function supported in the current DTV broadcasting environments, and adds or deletes a function provided to the digital broadcasting receiver to update the functions provided to the digital broadcasting receiver 100. For doing so, the function realization section 160 comprises an information analysis unit 161, a function identification unit 163 and a function structuring unit 165.

The information analysis unit 161 parses the PSI/SI to analyze the table ID of the PSI/SI and various table information about the digital broadcasting signals of the transport stream and inputs the analyzed information into the function identification unit 163.

The function identification unit 163 detects table information, which is required to execute each of functions according to the function data including all functions defined in the DTV standards stored in the storage section 170, from the table information of the PSI/SI input from the information analysis unit 161. If the necessary table information is detected, the function identification unit 163 determines that a corresponding function is supported in the current broadcasting environments, creates an updating function list according to the supported functions and provides the updating function list to the function structuring unit 165.

The function structuring unit 165 provides the updating function list provided by the function identification unit 163 to the menu creation section 180 and stores it in the storage section 170. In addition, the function structuring unit 165 searches the data required to execute the functions in the updating function list from the storage section 170 and maps the searched data to a menu created in the menu creation section 180 so that when a corresponding function is selected from the menu, a program included in the data necessary for executing the function can be immediately executed, thereby updating the functions provided to the digital broadcasting receiver 100.

The storage section 170 stores the function list including all functions defined in the DTV standards and the data for executing functions including programs required to execute each of the functions. In addition, the storage section 170 stores the updating function list and data required to create a menu for the function selection of the digital broadcasting signal receiver 100, which menu will be displayed on the display section 190.

According to an exemplary embodiment of the present invention, the function realization section 160 makes a distinction between the data, which is identified in the function realization section 160, corresponding to the functions supported in the current broadcasting environments and other data, among the data for the function execution stored in the storage section 170. To do so, the data for executing the identified function may be separately stored in a location of the storage section 170 or an address appointing a stored location of the data for executing the identified function may be separately stored and managed.

The menu creation section 180 image-processes and creates a menu for a function selection with a graphic, such as a character(s) and/or an icon, using the data stored in the storage section 170 so that a user can select various kinds of the functions provided in the DTV broadcasting environments, and then outputs the created menu to the display section 190. The created menu comprises a selection menu for executing functions which are provided through the DTV transport stream for a user to view the broadcasting, for example functions of providing channel information and program information of the DTV broadcasting.

According to an exemplary embodiment of the present invention, the menu creation section 180 creates a menu according to the updating function list created by the function realization section 160. Accordingly, since the created menu does not include a selection item about a function unsupported in the current DTV broadcasting environments, confusion due to the selection item which is shown in the menu but is not executed does not occur.

The menu created in the menu creation section 180 is displayed on the display section 190. The display section 190 displays the created menu alone, or synthesizes the created menu with image data output from the A/V processing section 140 and then displays it. A user can operate an input device such as a remote control device (not shown) to select a function to be used while viewing the menu displayed on the display section 190.

Figure 2:
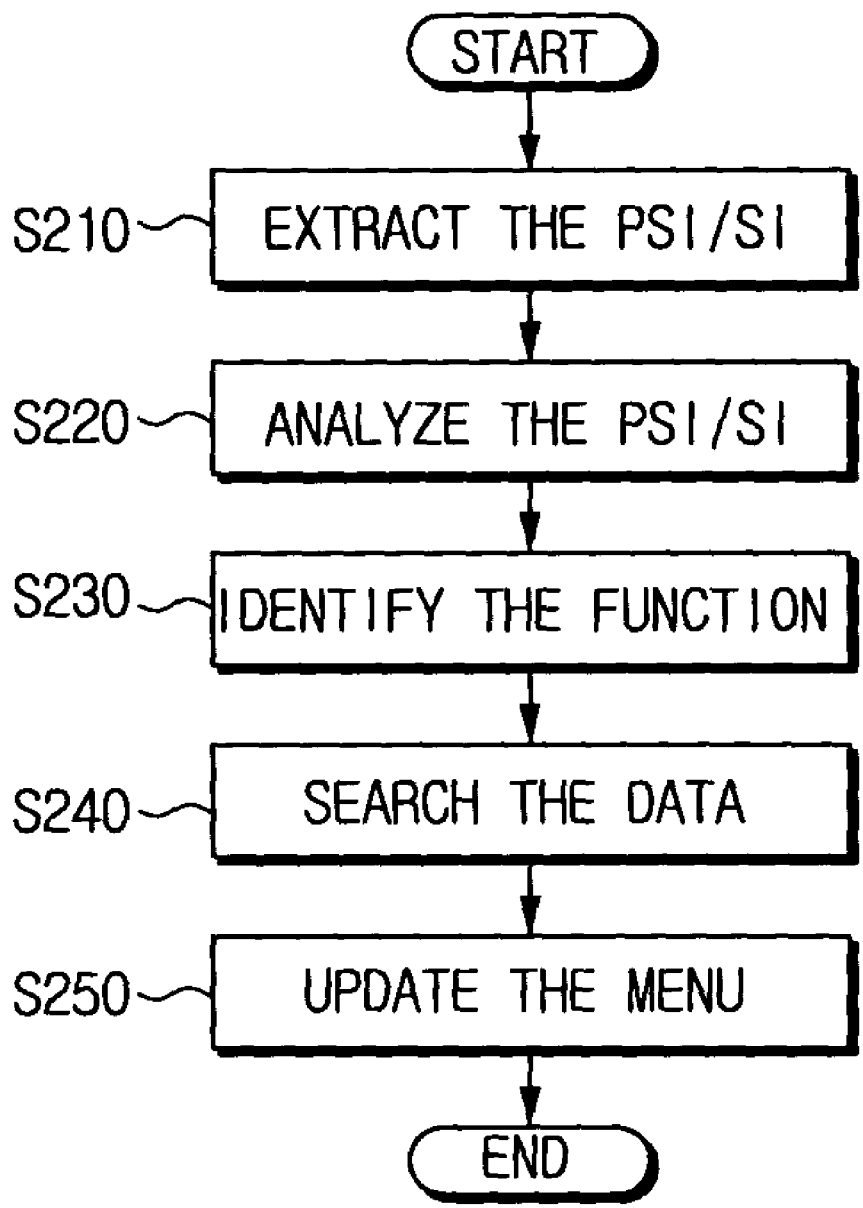
FIG. 2 is a flow chart for illustrating a method of updating a function in a digital broadcasting signal receiver according to an exemplary embodiment of the present invention.
Figure 3:
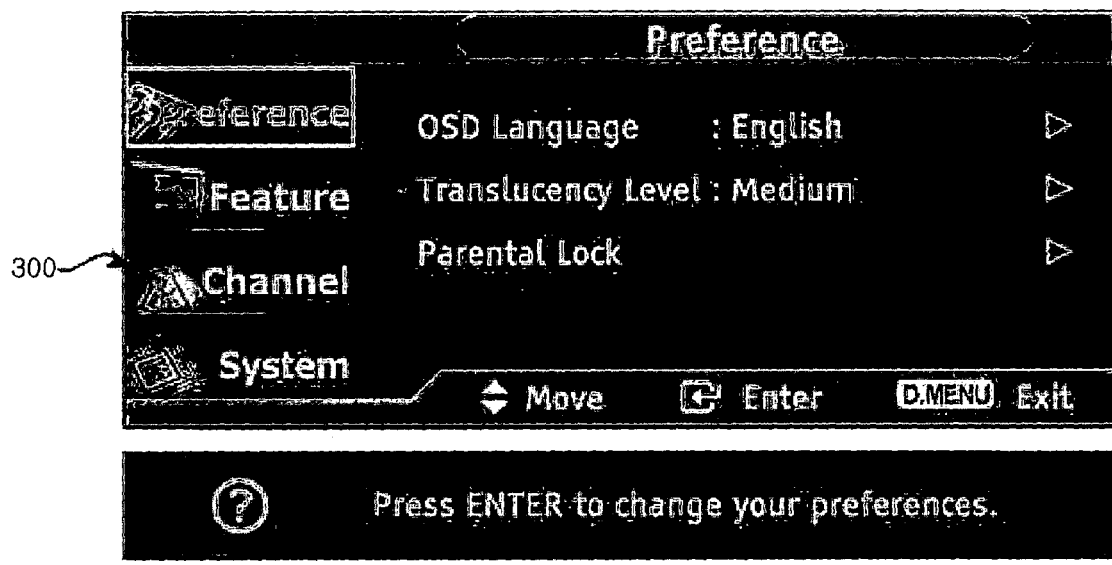
FIGS. 3 and 4 are views for illustrating a method of updating a function in a digital broadcasting signal receiver according to an exemplary embodiment of the present invention.
Figure 4:
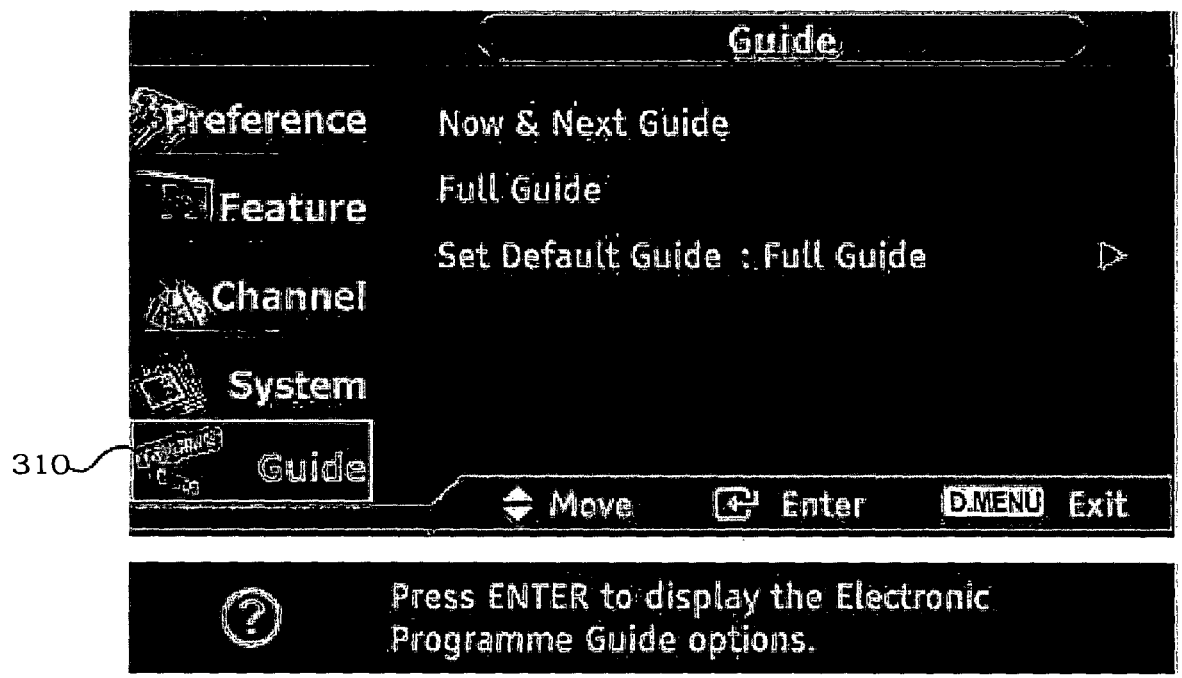

FIG. 2 is a flow chart for illustrating a method of updating a function list in a digital broadcasting signal receiver according to an exemplary embodiment of the present invention, and FIGS. 3 and 4 are views for illustrating a method of updating a function list in a digital broadcasting signal receiver according to an exemplary embodiment of the present invention.

Referring to FIG. 2, when the digital broadcasting signal receiver 100 receives the digital broadcasting signal, the received digital broadcasting signal is selected through the tuner 110 and the transport stream of the selected channel is demultiplexed through the DeMUX 120 according to the characteristics thereof.

The PSI/SI extraction section 150 extracts PSI and SI from the signal demultiplexed and input from the DeMUX 120 (S210), and provides the extracted PSI/SI to the function realization section 160.

Accordingly, the information analysis section 160 parses the extracted PSI/SI to analyze the table ID of the PSI/SI and the various table information about the digital broadcasting signals of the transport stream, in order to update the functions provided to the digital broadcasting signal receiver 100 (S220).

In addition, the function supported in the current broadcasting environments is identified through the analyzed table information of the PSI/SI (S230). For doing so, the function identification section 163 detects table information, which is required to execute each of functions according to the function lists including all functions defined in the DTV standards, from the analyzed table information, determines whether the necessary table information exists, and creates an updating function list consisting of the identified functions.

Then, the existing menu is updated by adding a menu for executing a function which is supported in the current broadcasting environments but does not exist in the existing menu and/or deleting the function which exists in the existing menu but is not supported in the current broadcasting environments, according to the updating function list, and a menu according to the updating function list is created (S240).

FIG. 3 shows an existing menu created according to the functions provided to the digital broadcasting signal receiver 100. Referring to FIG. 3, selection menus for selecting functions such as 'Preference', 'Feature', 'Channel' and 'System', etc. are displayed on left of the menu.

In the meantime, FIG. 4 shows a menu updated by the function updating device of the digital broadcasting signal receiver of the present invention, according to functions supported in current broadcasting environments. Referring to FIG. 4, it can be seen that a Guide item 310, which is not in the existing menu, is added. Accordingly, a user can select the added Guide item 310 to execute a corresponding function.

In addition, for each of the selection menus of the menu created according to the updating function list, a program for executing a corresponding function is mapped to update the whole programs for executing functions of the digital broadcasting signal receiver 100 (S250).

According to the present invention, it is possible to update the programs for executing the functions of the DTV using the PSI/SI included in the DTV broadcasting signal. Accordingly, it is not necessary to previously load the different programs in the DTV receiver in the manufacturing process, which will be sold in the countries which support different functions.

Therefore, it is possible to produce and sale the DTV receiver loaded with the same program in every country. In addition, it is possible to conveniently update the program using the DTV broadcasting signal without a separate post-service even when it is required to change the program for the reason a function supported in the DTV broadcasting environments will be added.

As described above, according to the present invention, it is not necessary to separately load the different programs in the DTV receiver according to various functions supported in diverse standards of the countries since the functions supported in the DTV broadcasting are detected and thus the existing functions provided to the digital broadcasting signal receiver are updated using the PSI/SI added to the transport stream of the selected channel.

In addition, since an update can be automatically done by adding or deleting the functions provided to the digital broadcasting signal receiver, it is possible to actively cope with the changes of the broadcasting environments.

The foregoing embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A device for updating a function in a digital broadcasting signal receiver, the device comprising:

a storage section which stores data for executing various functions provided to a digital broadcasting receiving section;

a program specific information/service information (PSI/SI) extraction section which extracts PSI/SI from a digital broadcasting signal which is received; and a function realization section which identifies a supported function from the digital broadcasting signal according to the PSI/SI and searches the data for executing the supported function from the storage section so that the supported function can be executed in the digital broadcasting receiving section, wherein the various functions are supported by a plurality of digital television broadcasting standards, and the data for executing the various functions are simultaneously stored in the storage section, and the various functions stored in the storage section include preloaded functions of the plurality of digital television broadcasting standards that are stored before the device receives any broadcasting information from a broadcasting service provider, and the various functions define a function database from which supported functions are individually identified and selected therefrom by the function realization section based on the digital television broadcasting standard of a current digital broadcasting signal, wherein the function realization section automatically updates a function list of supported functions provided to the digital broadcasting receiver by automatically adding each function supported by the current digital television broadcasting standard to the function list and automatically deleting each function not supported by the current digital television broadcasting standard from the function list to create an updating function list comprising of each of the supported functions and stores the updating function list in the storage section.

2. The device as claimed in claim 1, wherein the function realization section comprises:

an information analysis unit which parses the PSI/SI to analyze table information;

a function identification unit which identifies the supported function provided by the digital broadcasting signal according to the table information; and a function structuring unit which searches the data for executing the supported function from the storage section.

3. The device as claimed in claim 1, further comprising a menu creation section which creates a menu having a selection item for the supported function.

4. The device as claimed in claim 3, wherein the function realization section maps the data for executing the function to the selection item of the menu.

5. The device as claimed in claim 3, wherein the function realization section creates an updating function list consisting of the supported function and stores the updating function list in the storage section, and the menu creation section creates the menu according to the updating function list.

6. The device as claimed in claim 3, wherein the function realization section makes a distinction between the data for executing the supported function and other data stored in the storage section.

7. The device as claimed in claim 1, wherein each of the plurality of digital television broadcasting standards support a different set of functions.

8. The device as claimed in claim 7, wherein the function realization section identifies each function which is supported by a current digital television broadcasting standard according to the PSI/SI provided in a current digital broadcasting signal.

9. The device as claimed in claim 1, further comprising a menu creation section which automatically creates a menu having a selection item for each of the supported functions and the menu creation section creates the menu according to the updating function list.

10. The device as claimed in claim 9, wherein the menu excludes functions which are not supported by the current digital television broadcasting standard.

11. The device as claimed in claim 10, wherein the menu creation section automatically adapts to changes within the plurality of digital television broadcasting standards, such that the menu which corresponds to the current digital television broadcasting standard is created.

12. The device as claimed in claim 9, wherein the function realization section searches data required to execute each of the functions in the updating function list from the storage section and maps the searched data to the menu created in the menu creation section.

13. The device as claimed in claim 12, wherein when a corresponding function is selected from the menu, a program included in the data required for executing the corresponding function is immediately executed.

14. The device as claimed in claim 1, wherein the function realization section detects table information from the PSI/SI, the table information being required to execute each function supported by the current digital television broadcasting standard, and identifies which functions among the various functions are supported by the current digital television broadcasting standard such that the updating function list can be created therefrom.

15. The device as claimed in claim 1, wherein the adding each function supported by the current digital television broadcasting standard to the function list includes the function realization section individually selecting each supported function from among the various functions stored in the storage section and adding each selected supported function to the function list of supported functions, and the deleting each function not supported by the current digital television broadcasting standard from the function list includes the function realization section individually selecting each non-supported function from among the functions in the function list of supported functions and deleting each non-supported function therefrom.

16. The device as claimed in claim 1, wherein the function realization section determines whether a supported function is in the function list, determines whether the supported function is among one of the various functions, and adds the supported function to the function list if the supported function is not present in the function list but is among one of the various functions.

17. The device as claimed in claim 1, wherein each function not supported by the current digital television broadcasting standard deleted from the function list remains stored in the storage section as one of the various functions.

18. The device as claimed in claim 1, wherein the preloaded functions include the supported functions and the functions which are not supported by the current digital television broadcasting standard, and are maintained within the function database independent from the updating function list and the current digital broadcasting signal.

19. A method for updating a function in a digital broadcasting signal receiver, the method comprising:

analyzing program specific information/service information (PSI/SI) from a digital broadcasting signal to identify a function supported in the digital broadcasting signal;

searching data for executing the function from data previously stored to execute various functions provided to a digital broadcasting signal receiver; and updating a menu to include a selection item for selecting the function provided to the digital broadcasting signal receiver so that the function can be executed according to the searched data, wherein the various functions are supported by a plurality of digital television broadcasting standards, and the data for executing the various functions are simultaneously stored in a storage section, and the various functions stored in the storage section include preloaded functions of the plurality of digital television broadcasting standards that are stored before the digital broadcasting signal receiver receives any broadcasting information from a broadcasting service provider, and the various functions define a function database from which supported functions are individually identified and selected therefrom based on the digital television broadcasting standard of a current digital broadcasting signal, wherein the updating the menu includes automatically updating a function list of supported functions provided to the digital broadcasting receiver by automatically adding each function supported by the current digital television broadcasting standard to the function list and automatically deleting each function not supported by the current digital television broadcasting standard from the function list to create an updating function list comprising of each of the supported functions and stores the updating function list in the storage section.

20. The method as claimed in claim 19, wherein the identifying the function comprises parsing the PSI/SI to analyze table information and comparing the table information with the data for executing the function in order to identify the function.

21. The method as claimed in claim 19, further comprising creating a menu having a selection item for the function.

22. The method as claimed in claim 21, wherein the updating the menu comprises mapping the data for executing the function to the selection item of the menu.

23. The method as claimed in claim 21, wherein a distinction is made between the data for executing the supported function and other data stored in the storage section.

24. The method as claimed in claim 19, wherein the identifying the function comprises creating an updating function list consisting of the function, and the updating the menu comprises updating the menu according to the updating function list.

* * * * *